United States Patent [19]

Winkel et al.

[11] Patent Number: 4,688,377
[45] Date of Patent: Aug. 25, 1987

[54] APPARATUS FOR FARMING VEGETATION LYING ON THE GROUND

[75] Inventors: Jan Winkel, Sassenheim; Hermanus H. Vissers, Nieuw-Vennep, both of Netherlands

[73] Assignee: Multinorm B.V., Netherlands

[21] Appl. No.: 742,969

[22] Filed: Jun. 10, 1985

[30] Foreign Application Priority Data

Jun. 12, 1984 [NL] Netherlands ............... 8401846

[51] Int. Cl.⁴ .............. A01D 78/02; A01B 63/00
[52] U.S. Cl. .................... 56/228; 56/370; 172/456
[58] Field of Search ........... 56/228, 370, 15.5, 15.9, 56/328 R, 327 R, 6.7, 14.9, 377, 15.1, 15.2, 365, 385, 366; 172/311, 446, 456, 662, 776, 488; 280/415 R, 416

[56] References Cited

U.S. PATENT DOCUMENTS

| 3,122,210 | 2/1964 | French .................... | 56/385 |
| 4,026,093 | 5/1977 | Knusting et al. ......... | 56/370 |
| 4,056,923 | 11/1977 | Zweegers ................ | 56/366 |
| 4,151,886 | 5/1979 | Boetto et al. ............ | 172/311 |

FOREIGN PATENT DOCUMENTS

| 2517464 | 10/1975 | Fed. Rep. of Germany ........ | 56/370 |
| 2078481 | 1/1982 | United Kingdom ................. | 56/370 |

Primary Examiner—Robert P. Swiatek
Assistant Examiner—John G. Weiss
Attorney, Agent, or Firm—Pahl, Lorusso & Loud

[57] ABSTRACT

In an apparatus for farming vegetation lying on the ground, comprising a central frame, two first carrying arms that are pivotably mounted at the opposite sides of the frame and two second carrying arms that are pivotably mounted at the ends of the first carrying arms. Each second carrying arm is mechanically connected with the frame in such a way that pivoting the first carrying arm automatically leads to pivoting the second carrying arms. For this purpose a coupling bar can be provided between the central frame and each second carrying arm.

9 Claims, 3 Drawing Figures

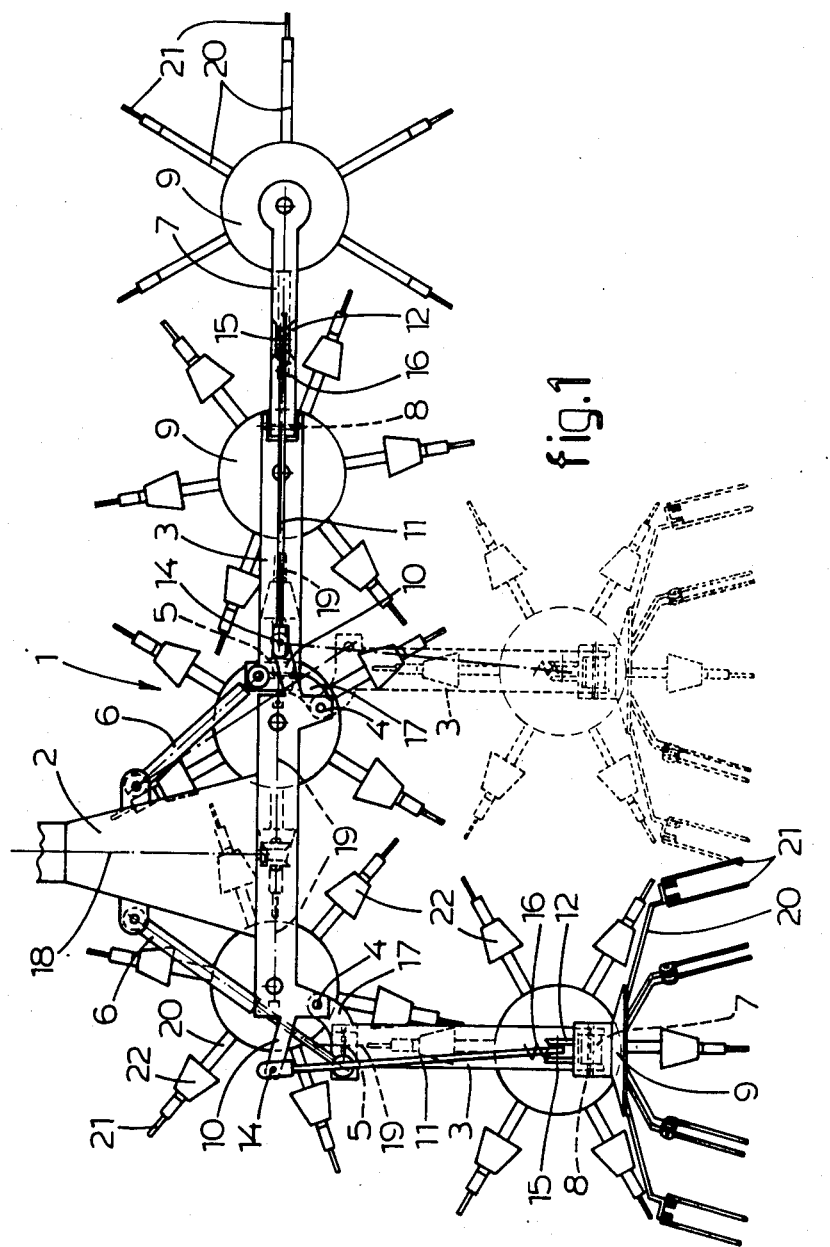

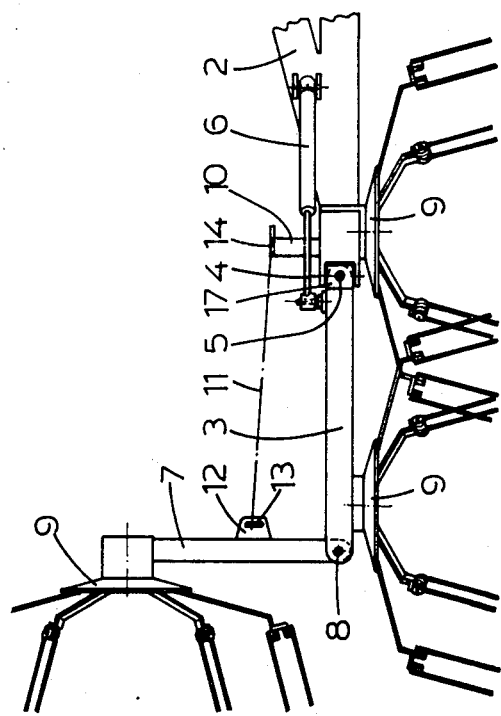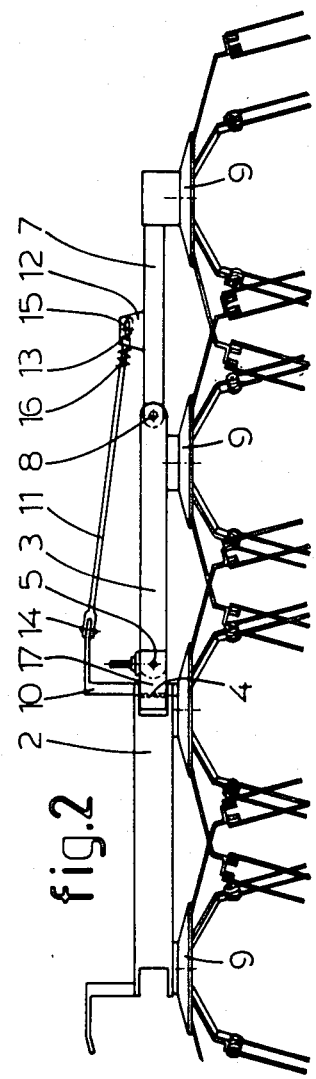

APPARATUS FOR FARMING VEGETATION LYING ON THE GROUND

BACKGROUND OF THE INVENTION

The invention relates to an apparatus for farming vegetation lying on the ground such as a shaker or the like that can be coupled with a tractor and that is provided with a frame that can be attached to the tractor, two first carrying arms that are mounted at the opposite sides of the frame, said first carrying arms being pivotable relative to the frame in a nearly horizontal plane around a vertical pivot axis between a working position in which said first carrying arms extend nearly transversely to the longitudinal axis of the tractor and a transport position in which these first carrying arms extend nearly in parallel with the longitudinal axis of the tractor, and with two second carrying arms mounted at the ends of the first carrying arms, said second carrying arms being pivotable relative to the corresponding first carrying arm in a nearly vertical plane around a horizontal pivot axis between a working position in which said second carrying arms extend nearly in a direct line with the first carrying arms and a transport position in which these second carrying arms extend upwardly and enclose an angle with the first carrying arms and wherein the frame, the first and the second carrying arms each carry one or more farming means.

A known apparatus of this type has in its working position a large span. When this apparatus has to be transported the need arises to narrow it in cross direction. This narrowing is a time-consuming operation because a number of locking bars between the carrying arms and the frame have to be released, the carrying arms all have to be pivoted and finally the locking bars have to be installed again. Especially when a number of parcels that are apart from each other have to be farmed by the apparatus, the over and over again pivoting of the carrying arms from the working position towards the transport position and vice versa is very time-consuming.

It is an object of the invention to provide an apparatus of the type referred to above in which the carrying arms can be pivoted from the working position towards the transport position and vice versa in an easy way.

SUMMARY OF THE INVENTION

Therefore, the apparatus according to the invention is characterized in that each second carrying arm is mechanically connected with the frame in such a way that during pivoting the corresponding first carrying arm from the working position towards the transport position and vice versa it is also pivoted from the working position towards the transport position and vice versa.

Because of said mechanical linkage between the frame and every second carrying arm it is sufficient to pivot the first carrying arms. Due to this the second carrying arms will pivot automatically without the need for separate operations.

In a preferred embodiment of the apparatus according to the invention each second carrying arm is connected with the frame through a coupling bar that with its one end is pivotable coupled with the second carrying arm and with its other end is pivotable coupled with an attachment point that does not coincide with the pivot axis of the corresponding first carrying arm around the frame and that is fixed on the frame.

The coupling bar offers an extremely simple, but very effective connection between every second carrying arm and the frame. Because the attachment point that is fixed on the frame does not coincide with the pivot axis of the corresponding first carrying arm, the distance between this attachment point and the second carrying arm would change during pivoting said first carrying arm if said second carrying arm would not pivot relative to the first carrying arm. The coupling bar, however, has a certain length, so that this second carrying arm has to pivot for maintaining the distance between itself and the attachment point on the frame.

When according to an advantageous embodiment of the apparatus according to the invention the one end of each coupling bar is coupled with a point in that part of the corresponding second carrying arm that is positioned at the side of the pivot axis between the corresponding first and second carrying arm facing away from the frame, wherein the attachment point is positioned at such a position outside of the pivot axis between the frame and the first carrying arm that during pivoting this carrying arm the horizontal distance between the attachment point and the coupling point between the coupling bar and the second carrying arm changes if the attachment point is positioned outside of the plane extending through the pivot axis of the second carrying arm and the coupling point between this carrying arm and the coupling bar, it is achieved in a very easy way that each second carrying arm carries out a pivoting motion when the corresponding first carrying arm is pivoted.

In a preferred embodiment the attachment point is positioned in that quadrant of a circle that in the pivoting direction of the first carrying arm lies in front of the quadrant of a circle that is passed through by this first carrying arm and that is positioned above the plane through the pivot axis of the second carrying arm and the coupling point. As a result each second carrying arm carries out an upwardly directed pivoting motion when the corresponding first carrying arm is pivoted from the working position towards the transport position and vice versa.

According to a handy embodiment of the apparatus according to the invention each second carrying arm is provided with an elongated slot extending in parallel with the carrying arm, wherein the one end of the coupling bar comprises a pin that fits into the slot and that can slide therein to and fro. This elongated slot functions as coupling point between the second carrying arm and the coupling bar and allows the second carrying arm to carry out a limited pivoting motion without the corresponding first carrying arm being pivoted. Such a pivoting motion offers the possibility of adaption to unevennesses of the ground to be farmed.

Further it is advantageous, if between the frame and each first carrying arm an adjustment means is provided for the motion of this first carrying arm. The user now only has to operate the adjustment means that for example can be driven manually, hydraulically, pneumatically or electrically.

Usually the frame at its opposite sides and every carrying arm carry a rotating drivable farming means with radially extending arms, which farming means in the working position of the carrying arms are mutually coupled through mutually coupled axes. When the carrying arms are placed in the transport position the coupling between the shafts in the frame and the shafts in the first carrying arms is severed so that the farming means of the first carrying arms and the farming means of the frame could rotate in an uncontrolled matter relative to each other. As a result the fingers carried by the arms of the farming means could get entangled in each other so that the carrying arms cannot easy be brought back into the working position any more.

According to the invention this disadvantage is removed in that the farming means of the frame and the farming means of the first carrying arms each are provided with means that in the transport position of the carrying arms couple the farming means of each first carrying arm with the adjoining farming means of the frame.

In this way it is attained that also in the transport position of the carrying arms the farming means of the frame and the farming means of the first carrying arm are coupled with each other so that an uncontrolled rotating of these farming means relative to each other is not possible any longer, at least only just restricted possible, and the carrying arms can easily be brought in the working position again.

According to a simple embodiment the arms of the farming means of the frame and the arms of the farming means of the first arms near to the ends are provided with guiding elements that in the transport position of the carrying arms during a rotation of a farming means force the adjoining farming means to rotate.

The invention will hereafter be explained further in reference to the drawing, in which an embodiment of the apparatus according to the invention is shown.

BRIEF DESCRIPTION OF THE DRAWINGS

FIG. 1 illustrates schematically a top plan view of the apparatus according to the invention, in which one half is presented in the working position and the other half is presented in the transport position;

FIG. 2 illustrates schematically a partial rear end view of the apparatus according to the invention in the working position, and FIG. 3 illustrates also schematically a partial side elevational view of the apparatus according to the invention in the transport position.

DETAILED DESCRIPTION OF THE PREFERRED EMBODIMENT

The illustrated apparatus is a so-called shaker 1 for shaking mowed grass. The shaker 1 comprises a frame 2 that can be mounted on a tractor and that can be coupled behind the tractor. At the two opposite sides of the frame 1 the first carrying arms 3 are mounted. The connection between these first carrying arms 3 and the frame 2 is essentially formed by a vertical pivot axis 4 that enables a pivoting motion of the first carrying arms 3 in a horizontal plane. Moreover, every first carrying arm 3 comprises also a second horizontal pivot axis 5 only serving for the adaption to unevennesses of the ground to be farmed. This adaption is limited in a way known on itself by not further shown abutment means.

The end of each first carrying arm 3 being connected with the frame 2 exists of a tumbler unit 17 that can be pivoted around the vertical axis 4 and that carries the horizontal axis 5, around which the remaining part of the first carrying arm 3 can pivot. Moreover, spring means can be applied for damping the motion of each first carrying arm 3 around this horizontal pivot axis 5.

As appears clearly from the figures, the first carrying arms 3 can be pivoted between a working position, in which they extend transversely to the longitudinal axis of the shaker 1 (FIGS. 1, 2) and a transport position, in which they are pivoted backwards away from the tractor over an angle of about 90°, until they extend in parallel with the longitudinal axis (FIG. 1). This pivoting motion of each first carrying arm 3 is obtained by a hydraulic cylinder 6, that is positioned between the frame 2 and this first carrying arm 3. This hydraulic cylinder 6 for example can be operated by the user from out of the tractor.

To the end of each of the first carrying arms 3 a second carrying arm 7 is attached. Every second carrying arm 7 can pivot around a horizontal pivot axis 8 between a working position, in which it is just about in a direct line with the corresponding first carrying arm 3 (FIGS. 1, 2) and a transport position, in which it extends upwardly and encloses an angle of about 90° with this first carrying arm 3 (FIG. 3).

The frame 2, the first carrying arms 3 as well as the second carrying arms 7 carry farming means 9 for farming the vegetation lying on the ground.

To each side on the frame 2 a jib 10 is attached to which the one end of a coupling bar 11 is secured. The other end of the coupling bar 11 comprises a pin 15 that is journalled in two upwardly extending lips 12 provided on each second carrying arm 7 and having a slit-formed recess 13. Moreover, on each coupling rod a spring 16 is positioned cooperating with the lips 12. The slit-formed recess 13 and the spring 16 provide an adaption of the position of each second carrying arm 7 to unevennesses in the surface to be farmed.

As shown clearly in FIG. 1, the attachment point 14 between every coupling bar 11 and the frame 2 does not coincide with the vertical pivot axis 4 of the corresponding first carrying arm 3 but is relative thereof displaced forwardly and sidewardly into the direction of the corresponding second carrying arm 7. Moreover, every attachment point 14 is positioned above an imaginary plane that extends through the horizontal pivot axis 8 of the respective second carrying arm 7 and the lips 12 that act as coupling point between the coupling bar 11 and this second carrying arm 7 (FIG. 2).

When a first carrying arm 3 is pivoted by the hydraulic cylinder 6 from the working position (FIGS. 1, 2) towards the transport position (FIGS. 1 and 3) the distance from the corresponding attachment point 14 to the lips 12 increases, at least if the corresponding second carrying arm 7 would not rotate relative to this carrying arm 3. However, because the attachment point 14 and the lips 12 are coupled together by the coupling bar 11, the distance between the attachment point 14 and these lips 12 has to remain constant (apart from the restricted adjustment possibility due to the slit-formed recesses 13). As a result each second carrying arm 7 will carry out an upward pivoting motion and will assume the position shown in FIGS. 1 and 3.

If the attachment point 14 would be positioned below the imaginary plane mentioned before, each second carrying arm 7 would carry out an opposite, downward pivoting motion.

When pivoting the first carrying arms 3 from the transport position towards the working position the second carrying arms 7 are likewise pivoted from the transport position towards the working position.

In the apparatus shown in FIG. 1 the shafts, through which the farming means 9 can be driven, are schematically illustrated by means of dotted lines 18 and 19. The shaft 18 that is positioned in the frame 2 can be conventionally coupled with the power take-off of the tractor. The remaining shafts 19 are driven through the shaft 18.

The shaft 19 driving the farming means 9 that are carried by the frame 2 are in the working position of the carrying arms 3, 7 coupled with the shafts 19 of the carrying arms 3. In the coupled situation of all shafts 19 the farming means 9 rotate on time, this means that radially extending arms 20 of adjoining farming means 9 always precisely mesh and cannot impinge on each other. The arms 20 carry at their end downwardly facing fingers 21 that throw up the vegetation lying on the field.

When the carrying arms 3 are pivoted towards the transport position the coupling between the shafts 19 of the frame and the shafts 19 of the carrying arms 3 is severed. As a result the farming means 9 of the frame 2 and the farming means 9, that are supported by the carrying arms 3, would be free to rotate relative to each other so that the permanent relative position of the farming means 9 would get lost and they would not mesh correctly anymore. Hereby the fingers 21 would get entangled and the carrying arms cannot be brought in the working position again then. This problem is solved in the apparatus illustrated in FIG. 1 in that to the arms 20 guiding elements 22 are attached that in the transport position of the carrying arms 3 by a small rotation of the farming means 9 abut against the arms 20 or fingers 21 of the adjoining farming means 9, thereby rotating this farming means. Due to this the permanent relative position of the farming means 9 is maintained and the carrying arms 3 can be brought into the working position from the transport position without problems. In the working position the arms 20 and the fingers 21 are not in contact with the guiding elements 22. The remaining freedom of movement of the farming means 9 of the frame 2 and the carrying arms 3 in the transport position can be met easily by shaping the coupling elements of the respective shafts 19 such, that a slight relative rotation of the shafts 19 by getting meshed is corrected automatically, for example by providing one of the coupling elements with inclined surfaces.

The invention is not limited to the embodiment described above, but can be varied widely within the scope of the invention. Several combinations of the location of each attachment point 14 relative to the corresponding vertical pivot axis 4 and the location of the coupling point between the coupling rod 11 and the corresponding second carrying arm 7 are possible that too lead to the desired pivoting motion of each second carrying arm 7 when the respective first carrying arm 3 is pivoted from the working position towards the transport position and vice versa.

We claim:

1. Apparatus for farming vegetation lying on the ground such as a shaker or the like that can be coupled with a tractor and that is provided with a frame that can be attached to the tractor, said apparatus comprising two first carrying arms mounted at opposite sides of the frame, said first carrying arms being pivotable relative to the frame in a nearly horizonal plane around a vertical pivot axis between a working position in which said first carrying arms extend nearly transversely to the longitudinal axis of the tractor and a transport position in which these first carrying arms extend nearly in parallel with the longitudinal axis of the tractor, and with two second carrying arms mounted at the ends of the first carying arms, said second carrying arms being pivotable relative to the corresponding first carrying arm in nearly vertical plane around a horizontal pivot axis between a working position in which said second carrying arms extend nearly in a direct line with the first carrying arms and a transport position in which these second carrying arms extend upwardly and enclose an angle with the first carrying arms and wherein the frame, the first and the second carrying arms each carry one or more means for tossing hay or the like, each second carrying arm is mechanically connected with the frame in such a way that during pivoting the corresponding first carrying arm from the working position towards the transport position and vice versa said second carrying arm is also pivoted from the working positon towards the transport position and vice versa.

2. Apparatus according to claim 1, wherein each second carrying arm is connected with the frame through a coupling bar and wherein one end of said coupling bar is pivotably coupled with the second carrying arm and the other end of said coupling bar is pivotably coupled with an attachment point that does not coincide with the pivot axis of the corresponding first carrying arm around the frame, said attachment point being fixed on the frame.

3. Apparatus according to claim 2, wherein the one end of each coupling bar is coupled with a point in a part of the corresponding second carrying arm that is positioned at the side of the substantially horizontal pivot axis between the corresponding first and second carrying arm facing away from the frame, and wherein the attachment point is positioned at such a position outside of the substantially vertical pivot axis between the frame and the first carrying arm that during pivoting of this carrying arm the horizontal distance between the attachment point and the coupling point between the coupling bar and the second carrying arm changes if the attachment point is positioned outside of the plane extending through the pivot axis of the second carrying arm and the coupling point between this carrying arm and the coupling bar.

4. Apparatus according to claim 3, wherein the attachment point is positioned in that quadrant of a circle that the pivoting direction ofthe first carrying arm lies in front of the quadrant of a circle that is passed through by this first carrying arm and that is positioned above the plane through the pivot axis of the second carrying arm and the coupling point.

5. Apparatus according to claim 3, wherein each second carrying arm is provided with an elongated slot extending in parallel with the carrying arm, and wherein the one end of the coupling bar comprises a pin that fits into the slot and that can slide therein to and fro.

6. Apparatus according to claim 5, wherein the pin is resiliently held in the slot.

7. Apparatus according to claim 1, wherein between the frame and each first carrying arm an adjustment means is provided for the motion of this first carrying arm.

8. Apparatus according to claim 1, wherein the frame at its opposite sides and every carrying arm carry a rotating drivable tossing means with radially extending arms, which tossing means in the working position of the carrying arms are mutually coupled through mutually coupled axes, and wherein the tossing means of the frame and the tossing means of the first carrying arms each are provided with means that in the transport position of the carrying arms couple the tossing means of each first carrying arm with the adjoining tossing means of the frame.

9. Apparatus according to claim 8, wherein the arms of the tossing means of the frame and the arms of the tossing means of the first arms near to the ends are provided with guiding elements that in the transport position of the carrying arms during a rotation of a tossing means force the adjoining tossing means to rotate.

* * * * *